US009009476B2

(12) United States Patent
Zhuang et al.

(10) Patent No.: US 9,009,476 B2
(45) Date of Patent: Apr. 14, 2015

(54) MULTI-APPLICATION SMART CARD, AND SYSTEM AND METHOD FOR MULTI-APPLICATION MANAGEMENT OF SMART CARD

(75) Inventors: Xiao Zhuang, Shanghai (CN); Zhijun Lu, Shanghai (CN); Shuo He, Shanghai (CN); Hongwen Meng, Shanghai (CN)

(73) Assignee: China Unionpay Co., Ltd., Shanghai (CN)

( * ) Notice: Subject to any disclaimer, the term of this patent is extended or adjusted under 35 U.S.C. 154(b) by 300 days.

(21) Appl. No.: 13/394,803

(22) PCT Filed: Aug. 27, 2010

(86) PCT No.: PCT/CN2010/001302
§ 371 (c)(1),
(2), (4) Date: May 30, 2012

(87) PCT Pub. No.: WO2011/029266
PCT Pub. Date: Mar. 17, 2011

(65) Prior Publication Data
US 2012/0246476 A1    Sep. 27, 2012

(30) Foreign Application Priority Data

Sep. 11, 2009   (CN) .......................... 2009 1 0195624

(51) Int. Cl.
G06F 7/04       (2006.01)
G06F 15/16      (2006.01)
(Continued)

(52) U.S. Cl.
CPC .............. *G07F 7/10* (2013.01); *G06Q 20/3552* (2013.01); *G06F 21/34* (2013.01); *H04L 63/0853* (2013.01); *G06Q 20/3563* (2013.01); *G06Q 20/3574* (2013.01); *G06Q 20/35765* (2013.01)

(58) Field of Classification Search
CPC .................... G06F 21/30–21/31; G06F 21/34; G06F 21/40; G06F 21/44; G06F 21/64; G06F 2221/2153; H04L 63/0428; H04L 63/08; H04L 63/0853; H04L 9/3234; H04L 9/0877; H04L 29/6802; H04L 9/0897; G06Q 20/3574; G06Q 20/35765; G06Q 20/3563; G06Q 20/3552
USPC ............................... 713/168; 726/2, 16–21, 4
See application file for complete search history.

(56) References Cited

U.S. PATENT DOCUMENTS 6,402,028 B1     6/2002  Graham, Jr. et al.
2006/0196931 A1  9/2006  Holtmanns et al.
(Continued)

FOREIGN PATENT DOCUMENTS
CN         101231768        7/2008
(Continued)

OTHER PUBLICATIONS
GlobalPlatform Card Specification version 2.2, Mar. 2006, pp. 1-375, http://www.globalplatform.org/specificationscard.asp.*
(Continued)

*Primary Examiner* — Linglan Edwards
*Assistant Examiner* — Forrest Carey
(74) *Attorney, Agent, or Firm* — Blakely Sokoloff Taylor & Zafman (57) ABSTRACT

A multi-application smart card and a multi-application management system and method for the smart card are provided. The multi-application smart card comprises a management device for the application security domain, and the management device is use to manage and maintain the application security domains in the multi-application smart card, and the application security domains comprise a plurality of issuer application security domains which share the control right of the multi-application smart card. Optionally, the application security domains also comprise at least one cardholder application security domain which is subordinate to the issuer application security domain that creates the cardholder application security domain, and wherein the at least one cardholder application security domain is used to manage and maintain the applications created by the cardholder.

14 Claims, 6 Drawing Sheets

(51) Int. Cl.
  *G06F 17/30* (2006.01)
  *H04L 29/06* (2006.01)
  *G07F 7/10* (2006.01)
  *G06F 21/34* (2013.01)
  *G06Q 20/34* (2012.01)

(56) References Cited

U.S. PATENT DOCUMENTS

| | | |
|---|---|---|
| 2007/0022051 A1 | 1/2007 | Regan et al. |
| 2011/0061097 A1* | 3/2011 | Gregg et al. ............... 726/7 |
| 2011/0280406 A1* | 11/2011 | Ma et al. .................. 380/278 |
| 2012/0047237 A1* | 2/2012 | Arvidsson et al. ......... 709/219 |

FOREIGN PATENT DOCUMENTS

| | | | |
|---|---|---|---|
| CN | 201114171 | | 9/2008 |
| CN | 10500224 | | 8/2009 |
| EP | 1 004 992 | A2 | 5/2000 |
| EP | 1 431 862 | A2 | 6/2004 |
| EP | 1 498 856 | A2 | 1/2005 |
| EP | 2 048 591 | A1 | 4/2009 |
| EP | 2 048 594 | A1 | 4/2009 |
| GB | 2 457 221 | A | 8/2009 |
| WO | WO 98/43212 | | 10/1998 |
| WO | WO 01/78020 | A1 | 10/2001 |
| WO | WO 2005/076204 | A1 | 8/2005 |
| WO | WO2005076204 | * | 8/2005 ............. G06K 19/07 |

OTHER PUBLICATIONS

Rankl, W., et al., *Handbuch der Chipkarten: Aufbau 0 Funktionsweise—Einsatz von Smart Cards*, Dec. 31, 2002, XP055113973, Carl Hanser Verlag Munchen Wien, pp. 295-298.

\* cited by examiner

MULTI-APPLICATION SMART CARD, AND SYSTEM AND METHOD FOR MULTI-APPLICATION MANAGEMENT OF SMART CARD

This is a non-provisional application claiming the benefit of International Application Number PCT/CN2010/001302 filed Aug. 27, 2010.

TECHNICAL FIELD

The present invention relates to a smart card and an application management system and method for the smart card, more particularly, to the multi-application smart card and the multi-application management system and method for the smart card.

BACKGROUND

At present, along with the fact that the application of the smart card is continuously increasing and becoming more and more popular, user needs to possess and carry more and more smart cards (such as, for example, the bank payment cards on internet, the electronic transaction card, the electronic traffic card, etc.). However, the number and kinds of the smart card continuously increasing not only improve the cost of using the smart card, but also make the management of the smart card more difficult.

Therefore, in order to overcome the foregoing problem, the Global Platform specification proposes a multi-application management model for the smart card. In the model, the Card Manager plays the role of a centralized administrator in the card, and said model comprises a issuer security domain, the main responsibility of which is performing the responsibility of the issuer on the card, that is, it can carry out the operations of loading, installing, deleting the application provided by the issuer or the corresponding application provider. The multi-application management model also comprises the application provider security domains (i.e. the security domain of the cooperator), which is primarily responsible for managing cryptographic keys and providing the encryption operation related to these cryptographic keys, which cryptographic keys are independent of the issuer security domain (i.e. not being controlled by the issuer security domain), thereby the complete separation between the key and the issuer and/or the multi-application providers can be ensured by creating the application provider security domain. It can be seen that in aforementioned multi-application management model, the privilege security domain (i.e. the issuer security domain) executes the management rights of the smart card, and other security domains are created under the authorization of the privilege security domain, and thus they are managed by the privilege security domain. However, along with the fact that the market of the smart card is gradually maturing and forming a larger scale, abovementioned multi-application management model cannot meet the requirements of the condominium and symbiotic relationship in the market and the service of the smart card, i.e. it cannot conform to the real environment which is non-centralized and of multi-party co-administration. Meanwhile, said multi-application management model also cannot meet the requirements of appropriately leaning the control rights of the card toward the cardholder.

SUMMARY

In order to overcome the deficiencies in the prior art, a multi-application smart card and a multi-application management system and method for the smart card are provided, which are adapted to the real environment that is non-centralized and of multi-party co-administration.

The objects of the present invention can be realized by the following solutions:

A multi-application management system for the smart card, comprising a terminal, a server, a multi-application smart card and a card reader, and the terminal comprises a browser, a network protocol module and a network adapter, and wherein the multi-application smart card is connected to the terminal by means of the network adapter and the card reader, and the server is connected to the terminal by means of the network adapter, wherein the multi-application smart card comprises a management device for the application security domain, for managing and maintaining the application security domains in the multi-application smart card, and the application security domain includes a plurality of issuer application security domains which share the control right of the multi-application smart card.

In the solutions disclosed above, preferably, the application security domain also includes at least one cardholder application security domain which is subordinate to the issuer application security domain that creates the cardholder application security domain, for managing and maintaining the applications created by the cardholder.

In the solutions disclosed above, preferably, a secure channel between the multi-application smart card and the terminal is created by means of HTTP protocol.

In the solutions disclosed above, optionally, the plurality of issuer security domains decide whether to add a new issuer application security domain in the manner of voting.

In the solutions disclosed above, optionally, the terminal is a Web-based mobile phone, or POS, or ATM.

The objects of the present invention can also be realized by the following solutions:

A multi-application smart card, comprising an application module, a local operating system, a management device for the application security domain and a physical layer hardware, the management device for the application security domain is used to manage and maintain the application security domain in the multi-application smart card, and the application security domain comprises a plurality of issuer application security domains which share the control right of the multi-application smart card.

In the solutions disclosed above, preferably, the application security domain also includes at least one cardholder application security domain which is subordinate to the issuer application security domain which creates the cardholder application security domain, for managing and maintaining the applications created by the cardholder.

In the solutions disclosed above, preferably, a secure channel between the multi-application smart card and the external terminal is created by means of HTTP protocol.

In the solutions disclosed above, preferably, the local operating system comprises the Web-based server module which is used to encode, decode and interpret the interactive information between the application module and the external terminal.

In the solutions disclosed above, optionally, the plurality of issuer application security domains decide whether to add a new issuer application security domain by means of voting.

In the solutions disclosed above, optionally, the external terminal is a Web-based mobile phone, or POS, or ATM.

The objects of the present invention can also be realized by the following solutions:

A multi-application management method for a smart card, including the following steps:

(a) creating a secure channel between the multi-application smart card and a browser in a terminal;

(b) the multi-application smart card sending a event information to the browser in the terminal by means of a card reader;

(c) after receiving the event information, the browser obtaining the event parameters by means of analyzing, and passing the event parameters to the event handler;

(d) after receiving the event parameters, the event handler processing the event parameters so as to generate the request message containing the identification information of the multi-application smart card and the callback address, and transmitting the request message to the server;

(e) after receiving the request message, the server processing the request message so as to generate a response message, and sending the response message to the multi-application smart card by means of the browser, wherein the response message containing the identification of the application security domain to be operated;

(f) after receiving the response message, the multi-application smart card performing the specified operation on the corresponding application security domain, and then making the subsequent communications with the server; and wherein the application security domain includes a plurality of issuer application security domains which share the control right of the multi-application smart card.

In the solutions disclosed above, preferably, the application security domain also includes at least one cardholder application security domain which is subordinate to the issuer application security domain which creates the cardholder application security domain, for managing and maintaining the applications created by the cardholder.

In the solutions disclosed above, preferably, step (a) further includes the following steps:

(a1) the browser in the terminal sending the request message for creating a secure channel to the multi-application smart card, the request message for creating a secure channel containing the identification information of the domain to be operated and additional information as well as the browser's public key certificate, thereby declaring the algorithm and the public key supported by the terminal and the selected application security domains to be operated;

(a2) after receiving the request message for creating a secure channel, the multi-application smart card checking the contents of the received request message for creating a secure channel, verifying the public key certificate of the browser, and based on the additional information, determining the contents of the response message for creating the secure channel, which will be returned, thereby declaring the algorithm and the public key supported by the multi-application smart card and the suggested session algorithm supported by both;

(a3) after receiving the response message for creating the secure channel, the browser in the terminal determining whether to accept the suggestion of the multi-application smart card or to renegotiate;

(a4) the multi-application smart card generates a process key according to the negotiated algorithm, so as to protect the data encryption during the subsequent communications and prevent tampering.

In the solutions disclosed above, preferably, the secure channel between the multi-application smart card and the external terminal is created by means of HTTP protocol.

In the solutions disclosed above, optionally, the plurality of issuer application security domains decide whether to add a new issuer application security domain by means of voting.

In the solutions disclosed above, optionally, the terminal is a Web-based mobile phone, or POS, or ATM.

The multi-application smart card and the multi-application management system and method for the smart card disclosed in the present invention have the following advantages: the multi-application smart card has a plurality of issuer application security domains which share the control right of the smart card, thereby it is adapted to the real environment which is of multi-party co-administration; and the multi-application smart card has the cardholder application security domains, thereby it can meet the requirements of appropriately leaning the control right of the card toward the cardholder.

BRIEF DESCRIPTION OF THE DRAWING

In connection with the drawings, the technical features and advantages of the present invention will be better understood by the skilled in the art, in which.

DETAILED DESCRIPTION OF THE EMBODIMENTS

Figure 1:
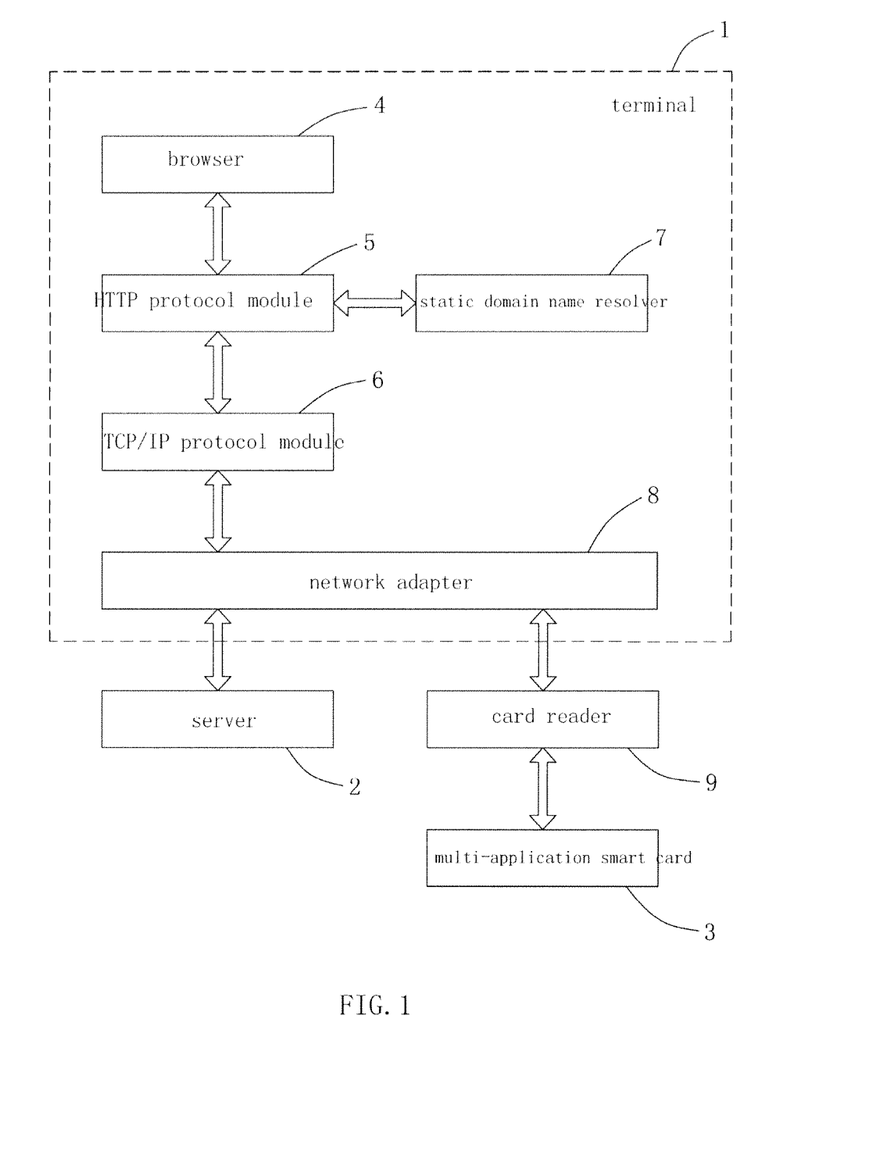
FIG. 1 is the structure diagram of the multi-application management system for the smart card according to the embodiments of the present invention.

FIG. 1 is the structure diagram of the multi-application management system for the smart card according to the embodiments of the present invention. As shown in FIG. 1, the multi-application management system for the smart card disclosed in the present invention comprises a terminal 1, a server 2, a multi-application smart card 3 and a card reader 9, and the terminal 1 comprises a browser 4, a HTTP protocol module 5, a static domain name resolver 7, a TCP/IP protocol module 6 and a network adapter 8. The multi-application smart card 3 is connected to the terminal 1 by means of the network adapter 8 and the card reader 9, whereas the server 2 is connected to the terminal by means of the network adapter 8. After the multi-application smart card 3 is inserted into the card reader 9, user can interact with the multi-application smart card 3 through the browser 4 in the terminal 1. For example, the event message encapsulated by the communication protocol is sent to the terminal 1 by the multi-application smart card 3 through the card reader 9 and the network adapter 8, thereafter, the message would be analyzed by the HTTP protocol module 5 and TCP/IP protocol module 6 to obtain the event parameter, and then the obtained event parameter is passed to the event handler by means of the mapping of the static domain name resolver 7. Similarly, the server 2 can interact with the terminal 1 in the similar manner.

It can be seen that the multi-application smart card 3 can interact with the server 2 by means of the medium (i.e. the terminal 1). When a client requests the service of the server 2, the client (i.e. the multi-application smart card 3) should pass its own identification information in the form of URL parameter to the server 2, and at the same time, the browser 4 should be informed of the callback address of the corresponding information of the server. The terminal 1 according to the embodiments of the present invention can be a mobile phone, a Web-based POS or an ATM etc.

Figure 2:
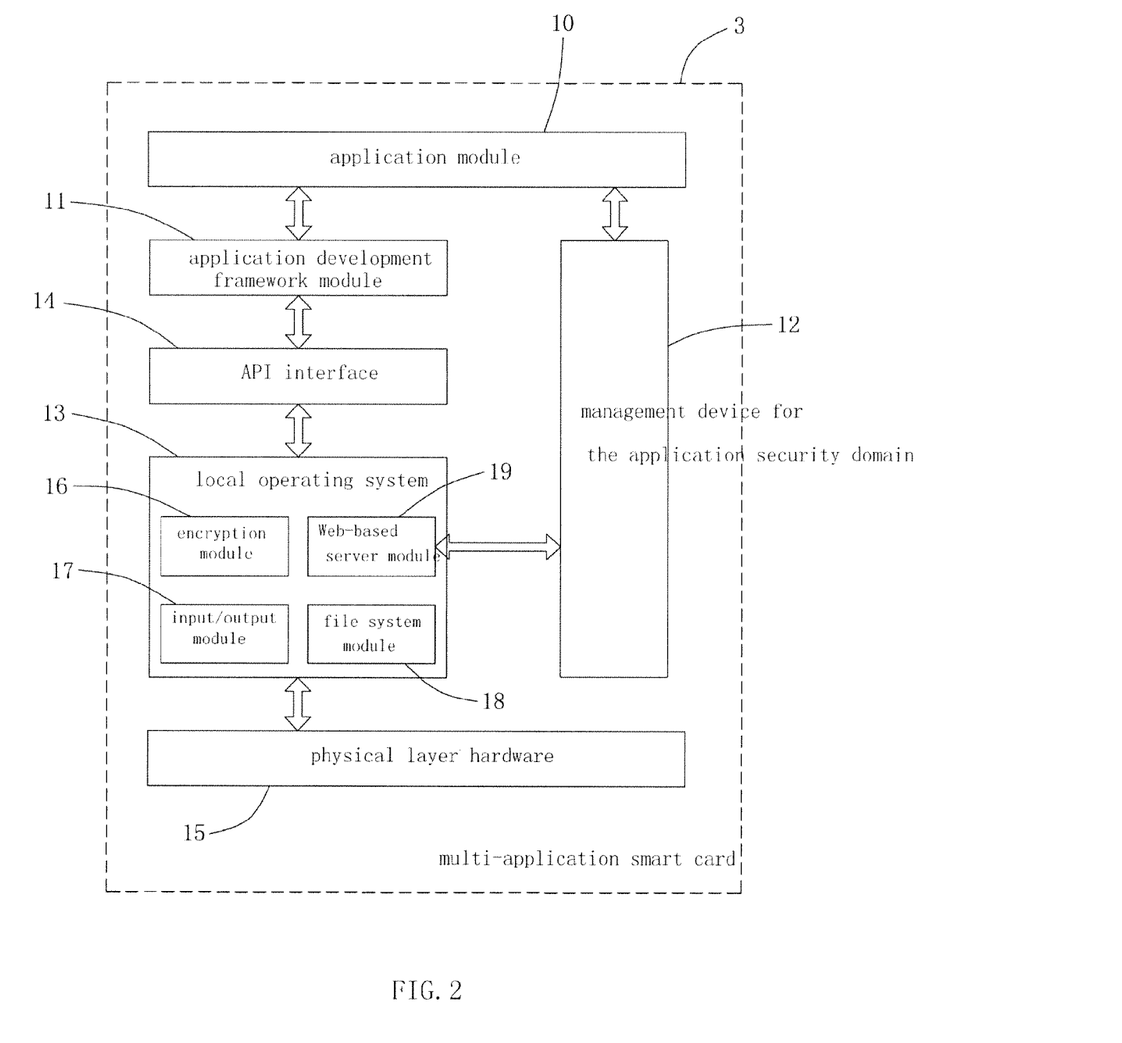
FIG. 2 is the structure diagram of the multi-application smart card according to the embodiments, of the present invention.
Figure 4:
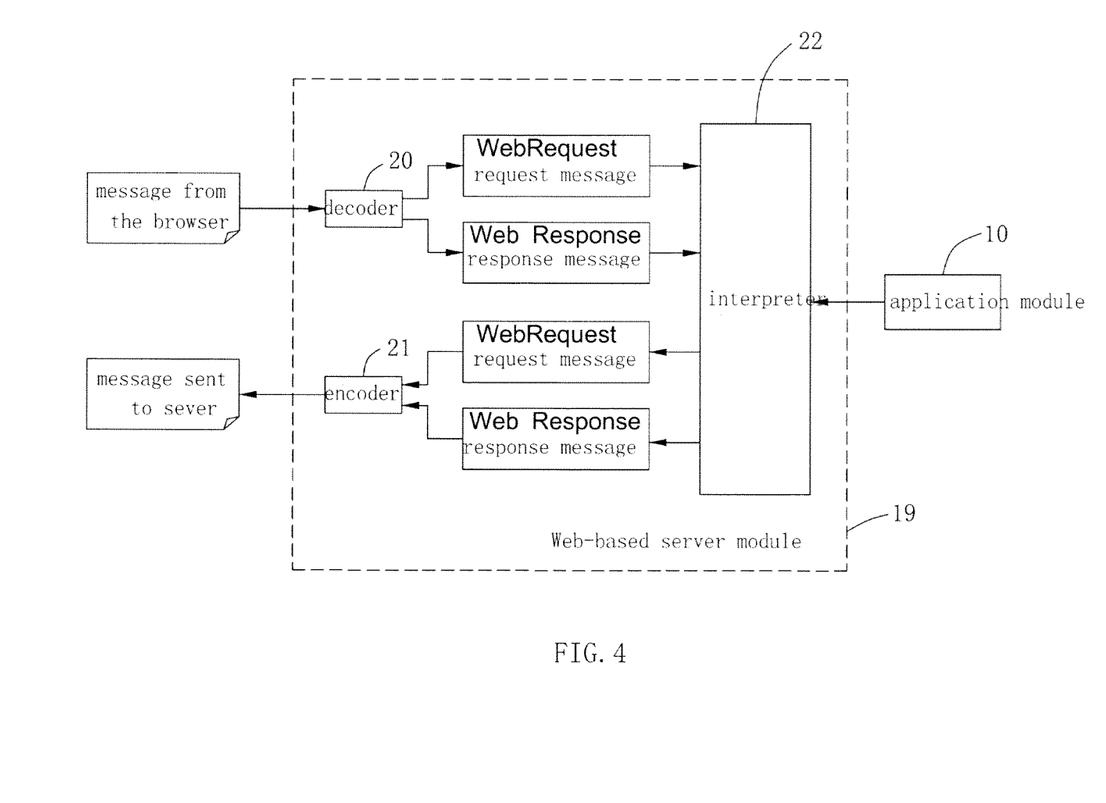
FIG. 4 is the schematic diagram of the work principle of the Web-based server module according to the embodiments of the present invention.

FIG. 2 is the structure diagram of the multi-application smart card according to the embodiments of the present invention. As shown in FIG. 2, the multi-application smart card 3 disclosed in the present invention comprises an application module 10, an application development framework module 11, an API interface 14, a local operating system 13, a management device for the application security domain 12 and a physical layer hardware 15, and the local operating system 13 comprises an encryption module 16, a input/output module 17, a file system module 18 and a Web-based server module 19. The Web-based server module 19 is used to encode, decode and interpret the interaction information between the application module 10, the server and the browser 4. FIG. 4 is the schematic diagram of the work principle of the Web-based server module according to the embodiments of the present invention. As shown in FIG. 4, the Web-based server module 19 comprises a decoder 20, an encoder 21 and an interpreter 22. After decoded by the decoder 20, the message from the browser 4 is transmitted to the interpreter 22 in the format of "WebRequest" or "WebResponse", thereafter, after analyzed and processed by the interpreter, the resulted request or response message is sent to the encoder 21, and then the Web-based server module 19 sends the encoded request or response message to the server 2 by means of the browser 4. Similarly, the application module 10 can interact with the Web-based server module 19 in the similar manner.

Figure 5:
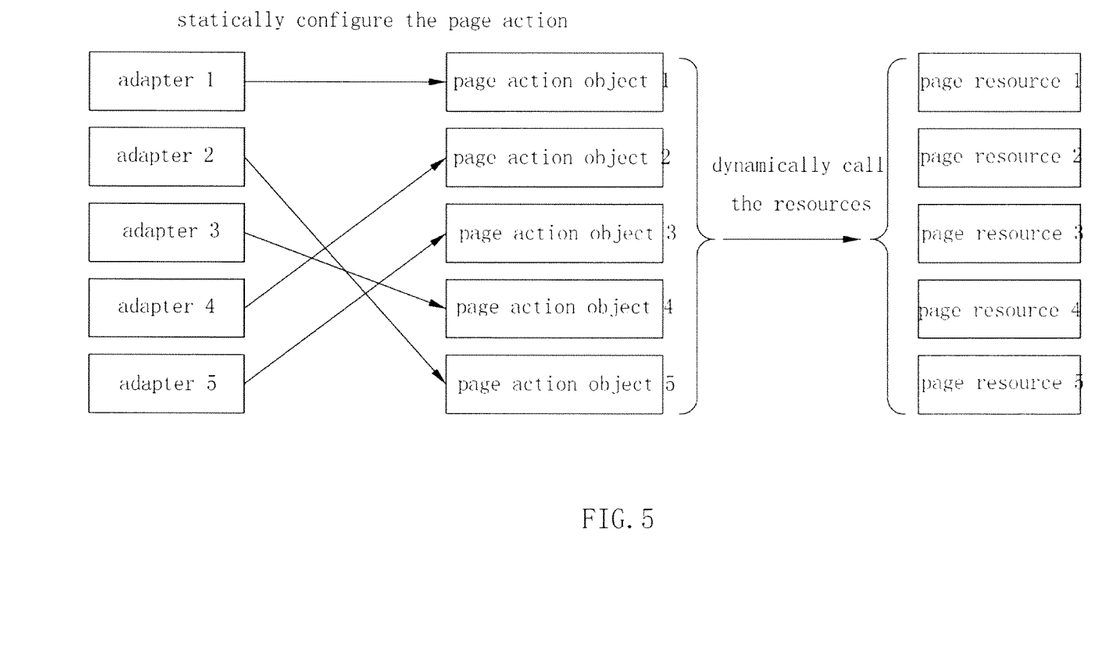
FIG. 5 is the schematic diagram of the work principle of the application module according to the embodiments of the present invention.

FIG. 5 is the schematic diagram of the work principle of the application module according to the embodiments of the present invention. As shown in FIG. 5, the application module 10 dynamically calls the resources by using the adapter (WebAdapter), and the adaptation procedure is as follows: the adapter selects a corresponding page action object (WebAction) based on the received information, and then the page action object invokes the corresponding action processing function based on the mapping relationship, thereby the page resources are dynamically called.

Figure 3:
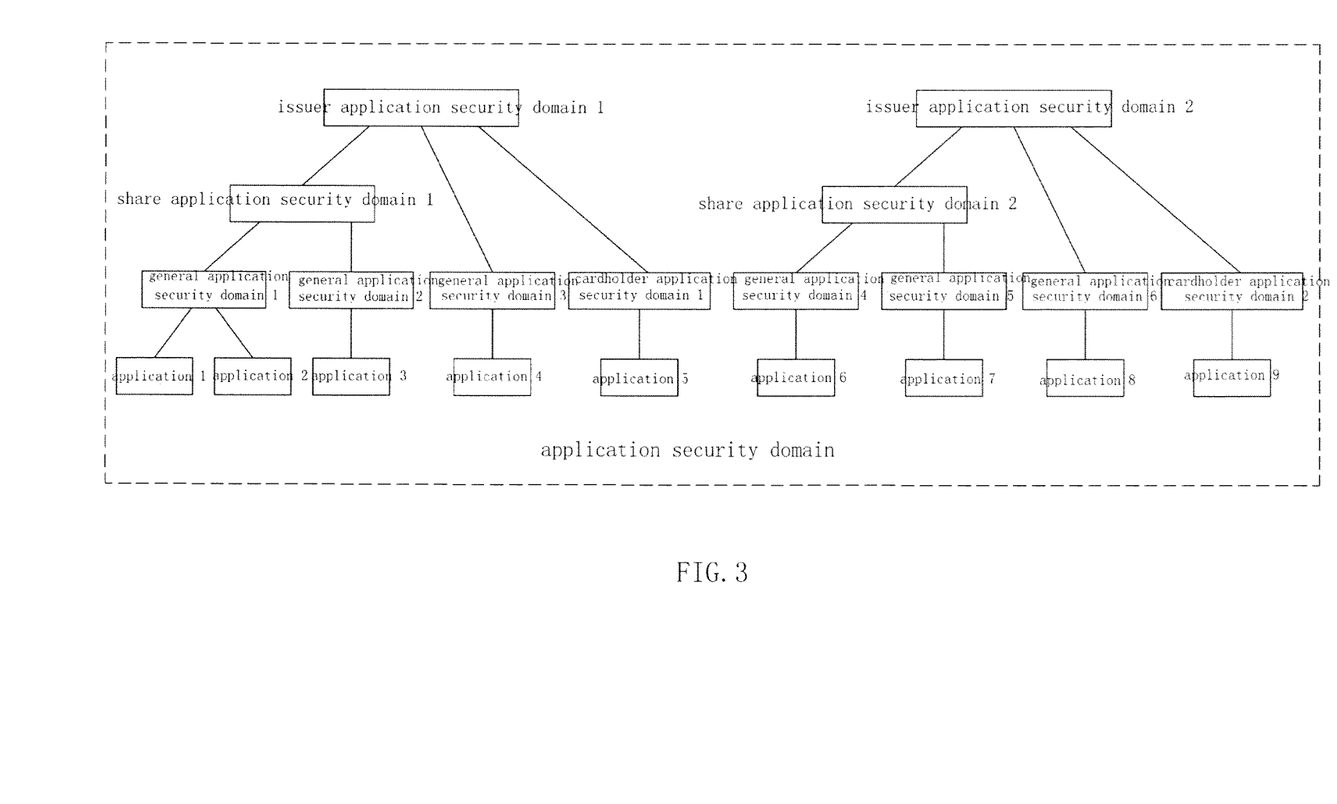
FIG. 3 is the structure diagram of the application security domain according to the embodiments of the present invention.

The management device for the application security domain 12 is used to centralizedly manage and maintain the applications of the various cooperators on the card, and keep them independent to some extent. Usually, there exist a plurality of applications on the smart card, which applications should be divided into several groups, and the applications of each group belong to the same external entity, such as issuer or cardholder. The on-card agent of the external entity is referred to as the application security domain. In the practical application, it is only through the application security domain that the external entities can manage the applications. FIG. 3 is the structure diagram of the application security domain according to the embodiments of the present invention. As shown in FIG. 3, the multi-application smart card disclosed in the present invention defines the following application security domain: issuer application security domain, which is used to manage the issuer application and can install and generate other application security domain, such as general application security domain or the cardholder application security domain, and can lock or delete the applications or application security domains created by itself, and a plurality of issuer application security domains can exist on the multi-application smart card; shared application security domain, which can share the control right of the card, and each of said shared application security domain can create general application security domain in its own domain, and can lock or delete the applications or application security domains created by itself; general application security domain (i.e. the cooperator application security domain), the issuer allow the third party organization to provide applications to the cardholder by means of the cards issued by the issuer, the on-card agent of the third party is referred to as the general application security domain, which can create applications, and can lock or delete the applications created by itself; the cardholder application security domain, the issuer allow the cardholders to install and delete the applications on their cards, the on-card agent of the cardholder is referred to as the cardholder application security domain, which can create applications or slice applications, and can lock or delete its own application security domains. The application security domain disclosed in the present invention also includes the service application and the slice application, the service application is a kind of special application on the smart card, and the service application does not interact with the terminal, and can provide services to other applications through its private interface. The slice application is a kind of lightweight application providing support for the trade applications, which can provide a flexible, extensible security architecture and data access mechanism.

The application security domain disclosed in the present invention has the following functions: serving as the agent of the external entity to maintain the application, and before performing the maintenance of the applications, the application security domain firstly establish a secure channel with the external entity so as to accomplish the mutual authentication, and it is only after the secure channel establishment is completed that the application security domain can accept and execute the application maintenance command sent by the external entity; providing the service for the applications or the application security domains which are directly belong to it, and usually, the application security domain would store some private key so as to provide the encryption and decryption service for the applications which are directly belong to it, and the service interface is defined by the application security domain.

The issuer application security domain disclosed in the present invention has been preset in the card when the card is issued, its main function is as follows: storing the certificate or key of the issuer, and the smart card disclosed in the present invention can comprise a plurality of issuer application security domains, wherein the plurality of issuer application security domains represent that the smart card is jointly issued by a plurality of issuers, each issuer corresponding to a issuer application security domain, meanwhile, the issuer certificate or key participates the establishment of the security channel, and proves its legal identity to the external entity; providing the key and the algorithm service for the issuer application, besides the certificate or key of the issuer, some private keys and private key algorithms can be stored in the issuer application security domain, and these keys and algorithms can provide key services for exterior through the self-defined service interface, only the applications which are directly subordinate to the issuer application security domain can use the key service of the issuer application security domain; maintaining the applications, wherein the issuer application security domain is responsible for maintaining the applications which is subordinate to it, the maintenance operations includes the installation and registration of the applications, the change of the lifecycle of the applications and the deletion of the applications, etc., and wherein before the issuer application security domain enables the maintenance operations, the issuer application security domain need to establish a secure channel with the external entity.

As shown in FIG. 3, the general application domain and the cardholder application security domain disclosed in the present invention are secondary security domain, which is subordinate to a certain issuer application security domain on the card. The general application security domain and the cardholder application security domain can be preset in the card when the card is issued, or can be created by the issuer application security domain after the card is issued, therefore, the general application security domain and the cardholder application security domain can be seen as the applications which are subordinate to the issuer application security domain, thereby they can call the service provided by the issuer application security domain. The main functions of the general application security domain are as follows: storing the keys of the application security domains, which keys participates in the establishment of the security channel, and proves its legal identity to the external entity; providing the key and algorithm service to the applications which are directly subordinate to it, and said key and algorithm are proprietary for the general application security domain, and the service interface is self-defined by the general application security domain, and is responsible for the maintenance of the applications which are subordinate to it, the maintenance operations include the installation and registration of the applications, the change of the lifecycle of the applications and the deletion of the applications etc., and after successfully establishing the security channel with the external entity, the general application security domain makes the application management operations by means of receiving the application management commands from the external entity. The main functions of the cardholder application security domain are as follows: storing the personal identification code (PIN) of the cardholder application security domain, before maintaining the applications of the cardholder application security domain, the cardholder need to firstly verify the PIN code of the cardholder application security domain, and the cardholder application security domain need self-define the commands for verifying the PIN code, after the validation of the PIN code, the cardholder application security domain can confirm the identity of the cardholder, i.e. a security channel with the exterior is created; providing the key service for the applications which are directly subordinate to it, and these keys and algorithms are proprietary for the cardholder application security domain, and the service interface is self-defined by the cardholder application security domain; being responsible for maintaining the applications which are subordinate to it, the maintenance operations comprise the installation and registration of the applications, the change of the lifecycle of the applications and the deletion of the applications etc., and after successfully verifying the PIN code of the cardholder application security domain, the cardholder application security domain manages the applications by means of receiving the application management commands from the external entity.

As shown in FIG. 3, in the application security domains disclosed in the present invention, optionally, the existing issuer application security domains can decide whether to add a new issuer application security domain by means of voting. The voting process is as follows: initializing the process, it is mainly used to determine the authentication algorithm; after receiving a request, every existing issuer application security domain begins to vote; opening each vote, comparing the contents of each vote, and then deciding whether to add a new issuer application security domain according to the result of said comparison. The key attributes (for example, whether the new issuer application security domain has the right to vote) of the new issuer application security domain is determined by the information contained in each vote.

In the multi-application management system for the smart card according to the embodiments of the present invention, the steps for installing the applications are as follows: establishing a secure channel by means of the HTTP protocol, wherein the key system uses asymmetric key architecture in connection with symmetric key architecture; if it is the application which is subordinate to the cardholder application security domain, then establishing the secure channel by using PIN; creating the handle of the application; downloading and installing the application; activating the application. The procedure of establishing the secure channel is as follows: the terminal 1 sending a request message for establishing a secure channel to the smart card 3, the message containing the identification of the domain to be operated and additional information as well as the public key certificate of the browser 4, thereby declaring the algorithm and public key supported by the terminal as well as the application security domain selected to be operated; after receiving the request message for establishing a secure channel, the smart card 3 check the contents of the received message, verify the certificate of the browser, and determine the contents of a response message for establishing a secure channel (the response message will be returned) according to the additional information, thereby declaring the algorithm and public key supported by the smart card 3 as well as the suggested session algorithm supported by both; after receiving the response message for establishing a secure channel, the terminal 1 determines whether to accept the suggestion of the smart card or to renegotiate; generating process key according to the negotiated algorithm, so as to protect the data encryption of the subsequent communication and prevent tampering.

Figure 6:
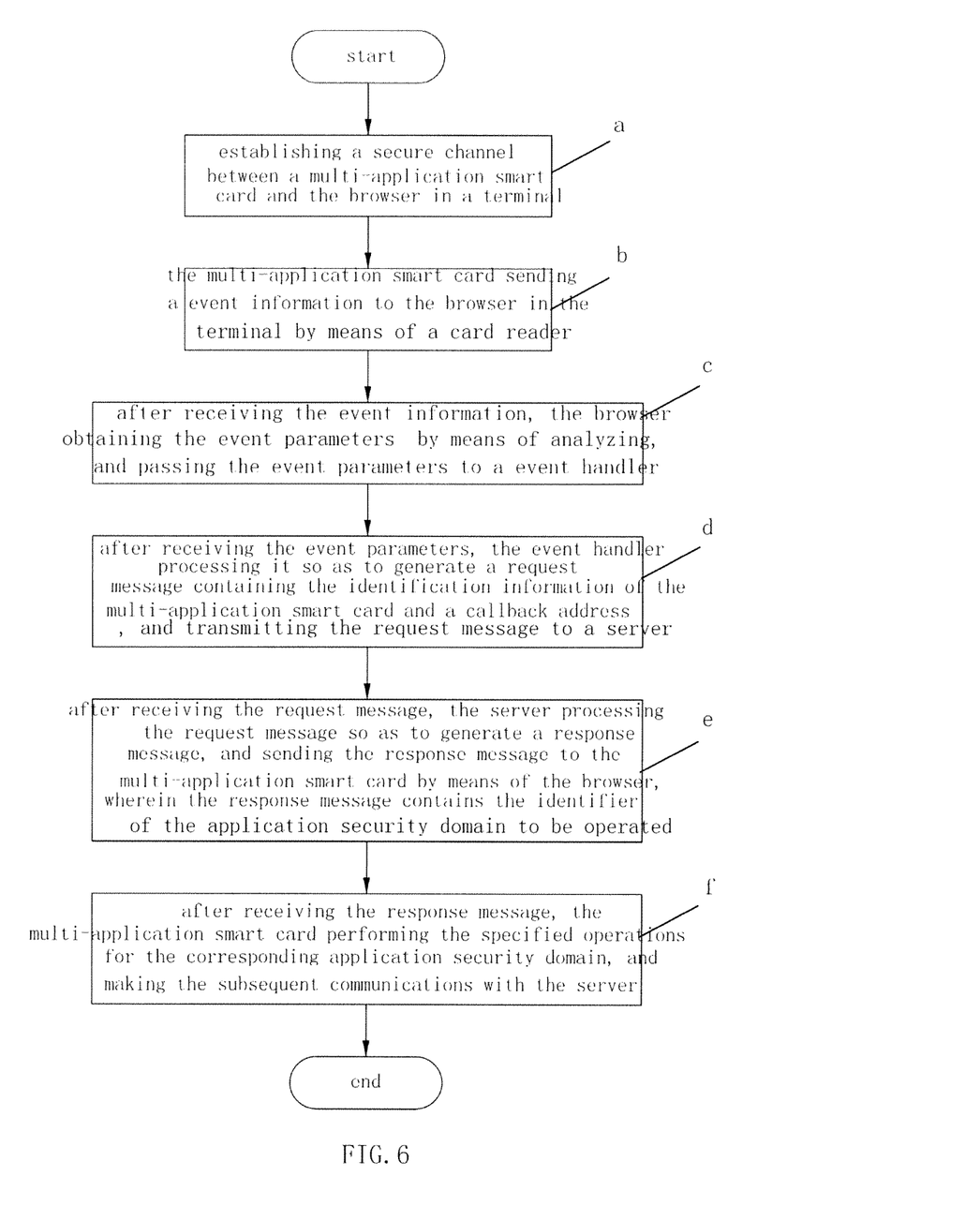
FIG. 6 is the flow chart of the multi-application management method for the smart card according to the embodiments of the present invention.

FIG. 6 is the flow diagram of the multi-application management method for the smart card according to the embodiments of the present invention. As shown in FIG. 6, the multi-application management method for the smart card includes the following steps: (a) establishing a secure channel between a multi-application smart card and the browser in a terminal; (b) the multi-application smart card sending a event information to the browser in the terminal by means of a card reader; (c) after receiving the event information, the browser obtaining the event parameters by means of analyzing, and passing the event parameters to a event handler; (d) after receiving the event parameters, the event handler processing it so as to generate a request message containing the identification information of the multi-application smart card and a callback address, and transmitting the request message to a server; (e) after receiving the request message, the server processing the request message so as to generate a response message, and sending the response message to the multi-application smart card by means of the browser, wherein the response message contains the identifier of the application security domain to be operated; (f) after receiving the response message, the multi-application smart card performing the specified operations for the corresponding application security domain, and making the subsequent communications with the server. The application security domain includes more than one issuer application security domains. Optionally, the application security domain includes at least one cardholder application security domain. Optionally, the existing issuer application security domains can decide whether to add a new issuer application security domain by means of voting. The voting process is as follows: initializing the process, it is mainly used to determine the authentication algorithm; after receiving a request, every existing issuer application security domain begins to vote; opening each vote, comparing the contents of each vote, and then deciding whether to add a new issuer application security domain according to the result of said comparison. The key attributes (for example, whether the new issuer application security domain has the right to vote) of the new issuer application security domain is determined by the information contained in each vote.

The step (a) in the multi-application management method for the smart card further includes the following steps:

(a1) the browser in the terminal sending the request message for establishing a secure channel to the multi-application smart card, the request message contains identification information of the domain to be operated and the additional information as well as the public key certificate of the browser, thereby declaring the algorithm and public key supported by the terminal and the application security domain selected to be operated; (a2) after receiving the request message for establishing a secure channel, the multi-application smart card checking the contents of the received request message, and verifying the public key certificate of the browser, and then determining the contents of a response message for establishing a secure channel (the response message will be returned) based on the additional information, thereby declaring the algorithm and public key supported by the multi-application smart card and the suggested session algorithm supported by both; (a3) after receiving the response message for establishing the secure channel, the browser in the terminal determining whether to accept the suggestion of the multi-application smart card or to renegotiate; (a4) the multi-application smart card generating a process key according to the negotiated algorithm, so as to protect the data encryption of the subsequent communications and prevent tampering.

Although the invention has been described in terms of the above preferred embodiments, the implements thereof are not limited to the above embodiments. It should be appreciated that various changes and modifications to the present invention can be made without departing from the spirit and scope of the present invention.

What is claimed is:

1. A multi-application management system for a smart card, comprising:
    a terminal having a browser, a network protocol module and a network adapter;
    a server;
    a multi-application smart card and a card reader, wherein the multi-application smart card is connected to the terminal by the network adapter and the card reader, and the server is connected to the terminal by the network adapter, wherein
    the multi-application smart card comprises a management device for an application security domain, the management device configured to manage and maintain the application security domain in the multi-application smart card; and
    the application security domain comprises a plurality of issuer application security domains which share a control right of the multi-application smart card, and at least one cardholder application security domain which is subordinate to the issuer application security domain that creates the cardholder application security domain, and the at least one cardholder application security domain is used to manage and maintain the applications created by the cardholder, and wherein the applications are installed by establishing a secure channel using an HTTP protocol,
    wherein each of said issuer application security domains includes a shared application security domain, said shared application security domain is configured to lock or delete the applications or application security domains created by itself, said shared application security domain having at least one general application security domain subordinate to said shared application security domain wherein the general application security domain is configured to lock or delete the applications created by itself; and
    wherein the key system uses asymmetric key architecture in connection with symmetric key architecture, and if it is the application which is subordinate to the cardholder application security domain, then establishing the secure channel by using a PIN.

2. The multi-application management system for the smart card according to claim 1 wherein a secure channel between the multi-application smart card and the terminal is established by using a hypertext protocol.

3. The multi-application management system for the smart card according to claim 2 wherein, the plurality of issuer application security domains decide whether to add a new issuer application security domain by a voting process.

4. The multi-application management system for the smart card according to claim 3, wherein, the terminal is a Web-based mobile phone, or point-of sale (POS) terminal, or automated teller machine (ATM).

5. A multi-application smart card, comprising:
    an application module;
    a local operating system;
    a management device and a physical layer hardware, the management device configured to manage and maintain an application security domain in the multi-application smart card, wherein the application security domain comprises a plurality of issuer application security domains which share a control right of the multi-application smart card, and at least one cardholder application security domain which is subordinate to the issuer application security domain that creates the cardholder application security domain, and the at least one cardholder application security domain is used to manage and maintain the applications created by the cardholder, and wherein the applications are installed by establishing a secure channel using an HTTP protocol,
    each of said issuer application security domains including a shared application security domain, said shared application security domain is configured to lock or delete the applications or application security domains created by itself, said shared application security domain having at least one general application security do main subordinate to said shared application security domain wherein the general application security domain is configured to lock or delete the applications created by itself; and
    wherein the key system uses a symmetric key architecture in connection with symmetric key architecture, and if it is the application which is subordinate to the cardholder application security domain, then establishing the secure channel by using a PIN.

6. The multi-application smart card according to claim 5 wherein a secure channel between the multi-application smart card and the external terminal is established by a hypertext protocol.

7. The multi-application smart card according to claim 6 wherein the local operating system includes a Web-based server module which is used to encode, decode and interpret the interactive information between the application module and the external terminal.

8. The multi-application smart card according to claim 7, wherein the plurality of issuer application security domains decide whether to add a new issuer application security domain by a voting process.

9. The multi-application smart card according to claim 7, wherein the external terminal is a Web-based mobile phone, or point-of sale (POS) terminal, or automated teller machine (ATM).

10. A multi-application management method for a smart card, comprising:
  (a) establishing a secure channel between a multi-application smart card and a browser in a terminal;
  (b) the multi-application smart card sending an event information to the browser in the terminal by a card reader;
  (c) after receiving the event information, the browser obtaining event parameters by analyzing, and passing the event parameters to an event handler;
  (d) after receiving the event parameters, the event handler processing the event parameters an as to generate a request message which contains identification information of the multi-application smart card and a callback address, and transmitting the request message to a server;
  (e) after receiving the request message, the server processing the request message so as to generate a response message, and sending the response message to the multi-application smart card by the browser, wherein the response message contains identification information of an application security domain to be operated;
  (f) after receiving the response message, the multi-application smart card performing predetermined operations for the application security domain, and initiating subsequent communications with the server,
    wherein, the application security domain includes a plurality of issuer application security domains which share a control right of the multi-application smart card, and at least one cardholder application security domain which is subordinate to the issuer application security domain that creates the cardholder application security domain, and the at least one cardholder application security domain is used to manage and maintain the applications created by the cardholder, and wherein the applications are installed by establishing a secure channel using an HTTP protocol,
    each of said issuer application security domains including a shared application security domain, said shared application security domain configured to lock or delete the applications or application security domains created by itself, said shared application security domain having at least one general application security domain subordinate to said shared application security domain wherein the general application security domain is configured to lock or delete the applications created by itself; and
    wherein the key system uses asymmetric key architecture in connection with symmetric key architecture, and if it is the application which is subordinate to the cardholder application security domain, then establishing the secure channel by using a PIN.

11. The multi-application management method for the smart card according to claim 10, further comprising:
  (a1) the browser in the terminal sending a request message for establishing a secure channel to the multi-application smart card, and wherein the request message for establishing a secure channel contains the identification information of the domain to be operated and additional information as well as the public key certificate of the browser, thereby declaring the algorithm and public key supported by the terminal and the application security domain selected to be operated;
  (a2) after receiving the request message for establishing a secure channel, the multi-application smart card checking the contents of the received request message for establishing a secure channel, verifying the public key certificate of the browser, and determining the contents of the response message for establishing a secure channel based on the additional information, and wherein the response message will be returned, thereby declaring the algorithm and public key supported by the multi-application smart card and the suggested session algorithm supported by both;
  (a3) after receiving the response message for establishing a secure channel, the browser in the terminal determining whether to accept the suggestion of the multi-application smart card or to renegotiate;
  (a4) the multi-application smart card generating a process key according to the negotiated algorithm, so as to protect the data encryption of the subsequent communications and prevent tampering.

12. The multi-application management method for the smart card according to claim 11, further comprising establishing the secure channel between the multi-application smart card and the terminal by a hypertext protocol.

13. The multi-application management method for the smart card according to claim 12 wherein the plurality of issuer application security domains decide whether to add a new issuer application security domain by a voting process.

14. The multi-application management method for the smart card according to claim 13, characterized in that, the terminal is a Web-based mobile phone, or point-of sale (POS) terminal, or automated teller machine (ATM).

* * * * *

UNITED STATES PATENT AND TRADEMARK OFFICE
CERTIFICATE OF CORRECTION

PATENT NO. : 9,009,476 B2  
APPLICATION NO. : 13/394803  
DATED : April 14, 2015  
INVENTOR(S) : Xiao Zhuang et al.

Page 1 of 1

It is certified that error appears in the above-identified patent and that said Letters Patent is hereby corrected as shown below:

In the Claims,

Column 10, Claim 5, at line 53, please delete "do main" and insert --domain--, and at line 57, please delete "a symmetric" and insert --asymmetric--.

Column 11, Claim 10, line 22, please delete "an as" and insert --so as--.

Signed and Sealed this
Twenty-fourth Day of November, 2015

Michelle K. Lee
*Director of the United States Patent and Trademark Office*